United States Patent
Yerramalli et al.

(10) Patent No.: US 11,863,997 B2
(45) Date of Patent: Jan. 2, 2024

(54) FRAME BASED CHANNEL ACCESS IN WIRELESS COMMUNICATION

(71) Applicant: QUALCOMM Incorporated, San Diego, CA (US)

(72) Inventors: Srinivas Yerramalli, Hyderabad (IN); Vinay Chande, San Diego, CA (US); Arumugam Chendamarai Kannan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/172,000

(22) Filed: Feb. 9, 2021

(65) Prior Publication Data
US 2021/0250776 A1 Aug. 12, 2021

Related U.S. Application Data

(60) Provisional application No. 62/975,101, filed on Feb. 11, 2020.

(51) Int. Cl.
| | | |
|---|---|---|
| *H04W 16/14* | (2009.01) | |
| *H04L 27/00* | (2006.01) | |
| *H04W 72/044* | (2023.01) | |

(52) U.S. Cl.
CPC ......... *H04W 16/14* (2013.01); *H04L 27/0006* (2013.01); *H04W 72/046* (2013.01)

(58) Field of Classification Search
None
See application file for complete search history.

(56) References Cited

U.S. PATENT DOCUMENTS

2019/0013883 A1* 1/2019 Tercero Vargas .... H04B 7/0413
2019/0387412 A1 12/2019 Kim et al.
(Continued)

FOREIGN PATENT DOCUMENTS

EP 3806521 A1 4/2021
WO 2019157754 A1 8/2019
(Continued)

OTHER PUBLICATIONS

Interdigital Inc: "On LBT for Beam-Based Transmission for NR-U", 3GPP Draft, 3GPP TSG RAN WG1 Meeting #92bis, R1-1804885 on LBT for Beam-Based Transmission for NR-U, 3rd Generation Partnership Project (3GPP), Mobile Competence Centre, 650, Route Des Lucioles, F-06921 Sophia-Antipolis Cedex, FRA , vol. RAN WG1, No. Sanya, China, Apr. 16, 2018-Apr. 20, 2018, Apr. 15, 2018 (Apr. 15, 2018), XP051427148, 6 Pages, Retrieved from the Internet: URL: http://www.3gpp.org/ftp/Meetings%5F3GPP%5FSYNC/ RAN1/Docs/, [retrieved on Apr. 15, 2018], Chapters 1, 2, section 1-2, p. 1-5.
(Continued)

*Primary Examiner* — Adnan Baig
(74) *Attorney, Agent, or Firm* — Loza & Loza, LLP/Qualcomm Incorporated

(57) ABSTRACT

A wireless device uses a frame-based channel access mode to access a wireless spectrum for wireless communication. The wireless device may use transmitter-side only channel sensing to determine whether or not the spectrum is idle. The frame-based channel access mode may use a fixed frame period that includes an initial sensing period for beam-based sensing and an idle period at the end of the frame to facilitate spectrum sharing.

27 Claims, 14 Drawing Sheets

(56) References Cited

U.S. PATENT DOCUMENTS

2020/0045735 A1* 2/2020 Kim .................. H04W 52/36
2020/0374932 A1 11/2020 Chen
2021/0360431 A1* 11/2021 Li ..................... H04L 12/1868
2021/0392683 A1* 12/2021 Awadin ............. H04B 7/088

FOREIGN PATENT DOCUMENTS

WO   2019210185 A1   10/2019
WO   2019214626 A1   11/2019

OTHER PUBLICATIONS

International Search Report and Written Opinion—PCT/US2021/017402—ISA/EPO—dated Jun. 1, 2021.

* cited by examiner

FRAME BASED CHANNEL ACCESS IN WIRELESS COMMUNICATION

PRIORITY CLAIM

This application claims priority to and the benefit of provisional patent application No. 62/975,101 filed in the United State Patent Office on Feb. 11, 2020, the entire content of which is incorporated herein by reference as if fully set forth below in its entirety and for all applicable purposes.

TECHNICAL FIELD

The technology discussed below relates generally to wireless communication systems, and more particularly, transmit side sensing frame-based channel access in wireless communication.

INTRODUCTION

In Fifth Generation (5G) New Radio (NR) networks, wireless devices can communicate with each other using beamformer communication that uses directional transmission and reception techniques. In some examples, a transmitting device may use a number of beams in different directions to communicate with a receiver. In some cases, the receiver can determine the perceived interference and report back the interference level and/or beam measurements to the transmitting device. Then, the receiver and the transmitting device can cooperate together to block or avoid the interferers to improve communication using beamforming. However, in some cases, the receiver may not be able to detect the interferers that affect the transmitting device in all scenarios.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a network, wireless devices and frame-based channel access methods for wireless communication between wireless devices in the network. A transmitting device can use transmitter-side only channel sensing to access the availability of a shared spectrum without relying on a report or feedback from a receiver that can communicate with the transmitting device. The frame-based channel access method can facilitate synchronized channel access. The frame-based channel access method also has applications in the transmissions of signals that require no acknowledgment/feedback.

One aspect of the disclosure provides a method of wireless communication operable at a transmitting device in a wireless network. The transmitting device senses a spectrum on a plurality of first beams in a first frame of a plurality of frames. Each of the plurality of frames comprises a sensing period for sensing the spectrum and an idle period for facilitating spectrum sharing with another wireless network. The transmitting device selects one or more beams of the plurality of first beams based on a result of sensing the spectrum in the sensing period of the first frame. The transmitting device transmits a signal in the first frame using the one or more beams in a time interval between the sensing period and the idle period of the first frame.

Another aspect of the disclosure provides an apparatus for wireless communication. The apparatus includes a communication interface configured to access a spectrum of a wireless network, a memory, and a processor operatively coupled with the communication interface and the memory. The processor and the memory are configured to sense the spectrum on a plurality of first beams in a first frame of a plurality of frames. Each of the plurality of frames comprises a sensing period for sensing the spectrum and an idle period for facilitating spectrum sharing with another wireless network. The processor and the memory are further configured to select one or more beams of the plurality of first beams based on a result of sensing the spectrum in the sensing period of the first frame. The processor and the memory are further configured to transmit a signal in the first frame using the one or more beams in a time interval between the sensing period and the idle period of the first frame.

Another aspect of the disclosure provides a wireless device for wireless communication in a wireless network. The wireless device includes means for sensing a spectrum on a plurality of first beams in a first frame of a plurality of frames. Each of the plurality of frames comprises a sensing period for sensing the spectrum and an idle period for facilitating spectrum sharing with another wireless network. The wireless device further includes means for selecting one or more beams of the plurality of first beams based on a result of sensing the spectrum in the sensing period of the first frame. The wireless device further includes means for transmitting a signal in the first frame using the one or more beams in a time interval between the sensing period and the idle period of the first frame.

Another aspect of the disclosure provides a non-transitory computer-readable medium storing computer-executable code at an apparatus for wireless communication. The computer-executable code comprises instructions for causing the apparatus to sense a spectrum on a plurality of first beams in a first frame of a plurality of frames. Each of the plurality of frames includes a sensing period for sensing the spectrum and an idle period for facilitating spectrum sharing with another wireless network. The computer-executable code further comprises instructions for causing the apparatus to select one or more beams of the plurality of first beams based on a result of sensing the spectrum in the sensing period of the first frame. The computer-executable code further comprises instructions for causing the apparatus to transmit a signal in the first frame using the one or more beams in a time interval between the sensing period and the idle period of the first frame.

These and other aspects of the invention will become more fully understood upon a review of the detailed description, which follows. Other aspects, features, and examples will become apparent to those of ordinary skill in the art, upon reviewing the following description of specific, exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In a similar fashion, while exemplary examples may be discussed below as device, system, or method examples, it should be understood that such exemplary examples can be implemented in various devices, systems, and methods.

DETAILED DESCRIPTION

Figure 1:
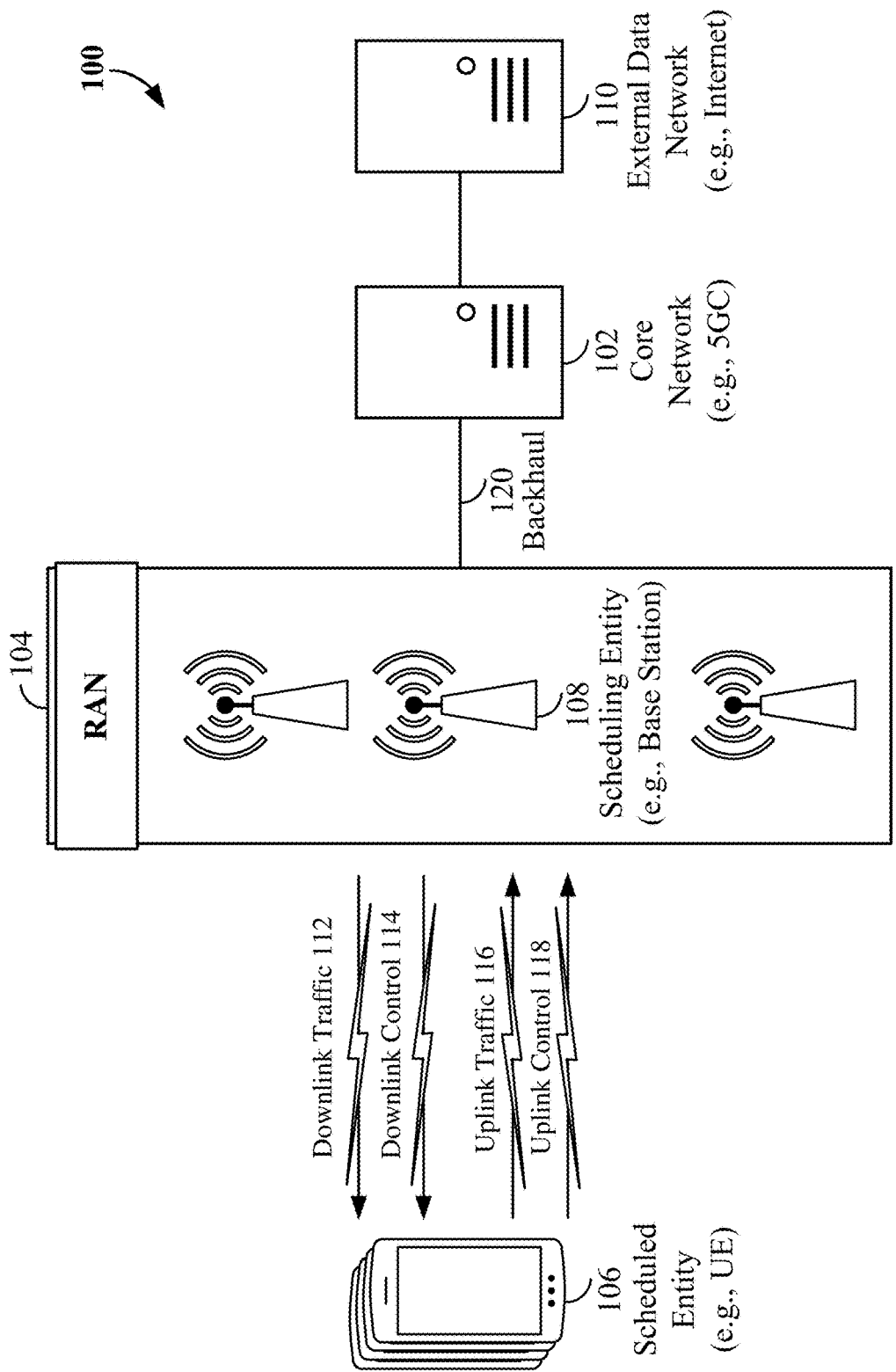
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G New Radio (NR) two initial operating bands have been identified as frequency range designations FR1 (410 MHz-7.125 GHz) and FR2 (24.25 GHz-52.6 GHz). It should be understood that although a portion of is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G New Radio (NR) operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The Fifth Generation (5G) New Radio (NR) networks (or simply referred to as 5G or NR networks) can be deployed using various frequency bands defined in the NR specifications. A transmission using higher frequencies (e.g., FR2 or above) has higher attenuation or pathloss than one using lower frequencies (e.g., FR1). A transmitting device can overcome the attenuation or pathloss using a directional transmission technique such as beamforming that transmits the signal in one or more highly focused beams to overcome propagation losses. A beam is a directional signal that can be generated by combining elements in an antenna array in such a way that signals at particular angles experience constructive interference while others experience destructive interference. A transmitting device can control the phase and relative amplitude of the signal at each transmitter (e.g., antenna) in order to create a pattern of constructive and destructive interference in the wavefront. In general, a receiver is in a better position than the transmitting device to detect and measure any interference to the beam(s). The receiver can report the interference, if any, back to the transmitting device to facilitate cooperative or receiver (Rx)-assisted interference management (e.g., interference mitigation) with the transmitting device. However, in some cases, the receiver may not be able to detect the interference due to the directional nature of beamformed communication, for example, using higher frequencies (e.g., FR2).

One aspect of the disclosure provides a method of accessing a channel in wireless communication. Using the method, an apparatus selects a plurality of first beams for performing a spectrum sensing procedure to access a spectrum. The spectrum may be shared with other devices from a different network. The apparatus performs the spectrum sensing procedure on the plurality of first beams in a sensing period of a first frame period. The first beams may be millimeter wave (mmW) beams. The apparatus selects one or more transmit beams from the plurality of first beams for accessing the spectrum, based on a result of the spectrum sensing procedure. Then, the apparatus transmits a signal in the first frame period using the one or more selected transmit beams. The apparatus may use the signal to reserve the spectrum in the selected beam.

Another aspect of the disclosure provides an apparatus for wireless communication. The apparatus includes a communication interface configured to access a spectrum, a memory, and a processor operatively coupled with the communication interface and the memory. The processor and the memory are configured to select a plurality of first beams for performing a spectrum sensing procedure to access the spectrum. The processor and the memory are further configured to perform the spectrum sensing procedure on the plurality of first beams in a sensing period of a first frame period. The processor and the memory are further configured to select one or more transmit beams from the plurality of first beams for accessing the spectrum, based on a result of the spectrum sensing procedure. The processor and the memory are further configured to transmit, via the communication interface, a signal in the first frame period using the one or more selected transmit beams. The apparatus may use the signal to reserve the spectrum in the selected beam.

Another aspect of the disclosure provides an apparatus for wireless communication using frame-based channel access. The apparatus includes means for selecting a plurality of first beams for performing a spectrum sensing procedure to access a spectrum. The apparatus further includes means for performing the spectrum sensing procedure on the plurality of first beams in a sensing period of a first frame period. The apparatus further includes means for selecting one or more transmit beams from the plurality of first beams for accessing the spectrum, based on a result of the spectrum sensing procedure. The apparatus further includes means for transmitting a signal in the first frame period using the one or more selected transmit beams. The apparatus may use the signal to reserve the spectrum in the selected beam.

Another aspect of the disclosure provides a non-transitory computer-readable medium storing computer-executable code at an apparatus for wireless communication using frame-based channel access. The computer-executable code causes a processor to perform various operations. The processor selects a plurality of first beams for performing a spectrum sensing procedure to access a spectrum. The processor performs the spectrum sensing procedure on the plurality of first beams in a sensing period of a first frame period. The processor selects one or more transmit beams from the plurality of first beams for accessing the spectrum, based on a result of the spectrum sensing procedure. The processor transmits a signal in the first frame period using the one or more selected transmit beams. The apparatus may use the signal to reserve the spectrum in the selected beam.

Another aspect of the disclosure provides a method of wireless communication operable at a transmitting device. The transmitting device senses a spectrum in a plurality of first beams in a first frame period of a plurality of frame periods, and each of the plurality of first beams is configured for communication in a different respective direction. The transmitting device selects one or more beams of the plurality of first beams that are idle when sensing the spectrum in the first frame period. Then, the transmitting device transmits a signal in the first frame period using the selected one or more beams.

For selecting the one or more beams, the transmitting device may detect the signal energy of the one or more beams, and determine that the one or more beams are idle when the detected signal energy is less than a predetermined threshold. The first frame period may include a plurality of sensing slots and a time interval after the plurality of sensing slots for transmitting the signal. For sensing the spectrum, the transmitting device may sense the spectrum using a different beam of the plurality of first beams in a different respective sensing slot of the plurality of sensing slots.

The transmitting device may sense the spectrum using a plurality of second beams in a second frame period of the plurality of frame periods. The plurality of second beams may include at least one beam that is different from the plurality of first beams.

The transmitting device may sense the spectrum in the plurality of first beams in a second frame period of the plurality of frame periods. The sensing of the plurality of first beams follows a first sequence of the plurality of first beams in the first frame period and a second sequence of the plurality of first beams in the second frame period. The first sequence is different from the second sequence. The second sequence may be derived from the first sequence based on a round-robin algorithm.

Each frame period of the plurality of frame periods may further include an idle period configured to prevent signal transmission associated with a predetermined beam or beam group. For transmitting the signal, the transmitting device may transmit a reservation message in the first frame period to reserve the one or more beams for communication in the first frame period. For selecting the one or more beams, the transmitting device may determine that the one or more beams are available for communication without receiving feedback on the one or more beams from a wireless device.

Another aspect of the present disclosure provides an apparatus for wireless communication. The apparatus includes a communication interface configured to access a spectrum, a memory, and a processor operatively coupled with the communication interface and the memory. The processor and the memory are configured to sense the spectrum in a plurality of first beams in a first frame period of a plurality of frame periods, each of the plurality of first beams configured for communication in a different respective direction. The processor and the memory are further configured to select one or more beams of the plurality of first beams that are idle when sensing the spectrum in the first frame period. The processor and the memory are further configured to transmit a signal in the first frame period using the selected one or more beams.

Aspects of the present disclosure provide a method of frame-based channel access in a wireless communication network using transmitter-side only channel sensing. With transmitter-side (Tx-side) only channel sensing, the transmitting device can determine whether or not the spectrum is idle on one or more beams without using beam feedback or measurements from other network nodes (e.g., a receiver) that may communicate with the transmitting device using the one or more beams. In some aspects, a transmitting device may use the frame-based channel access mode with Tx-side only sensing in a network that uses an unlicensed or shared spectrum. The frame-based channel access mode described herein may use a fixed frame period that includes an initial sensing period for beam-based signal sensing and an idle period at the end of the frame to facilitate spectrum sharing. In some aspects, the transmitting device may be a 5G New Radio (NR) network node that utilizes various frequency bands, possibly including FR2 or higher frequency bands, for beam based communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G or NR. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services. The UE may communicate with the RAN 104 using various licensed or unlicensed frequencies.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108. In some aspects, the scheduling entity can use a frame-based access mode to allocate resources for communication. The frame-based access mode will be described in more detail below.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
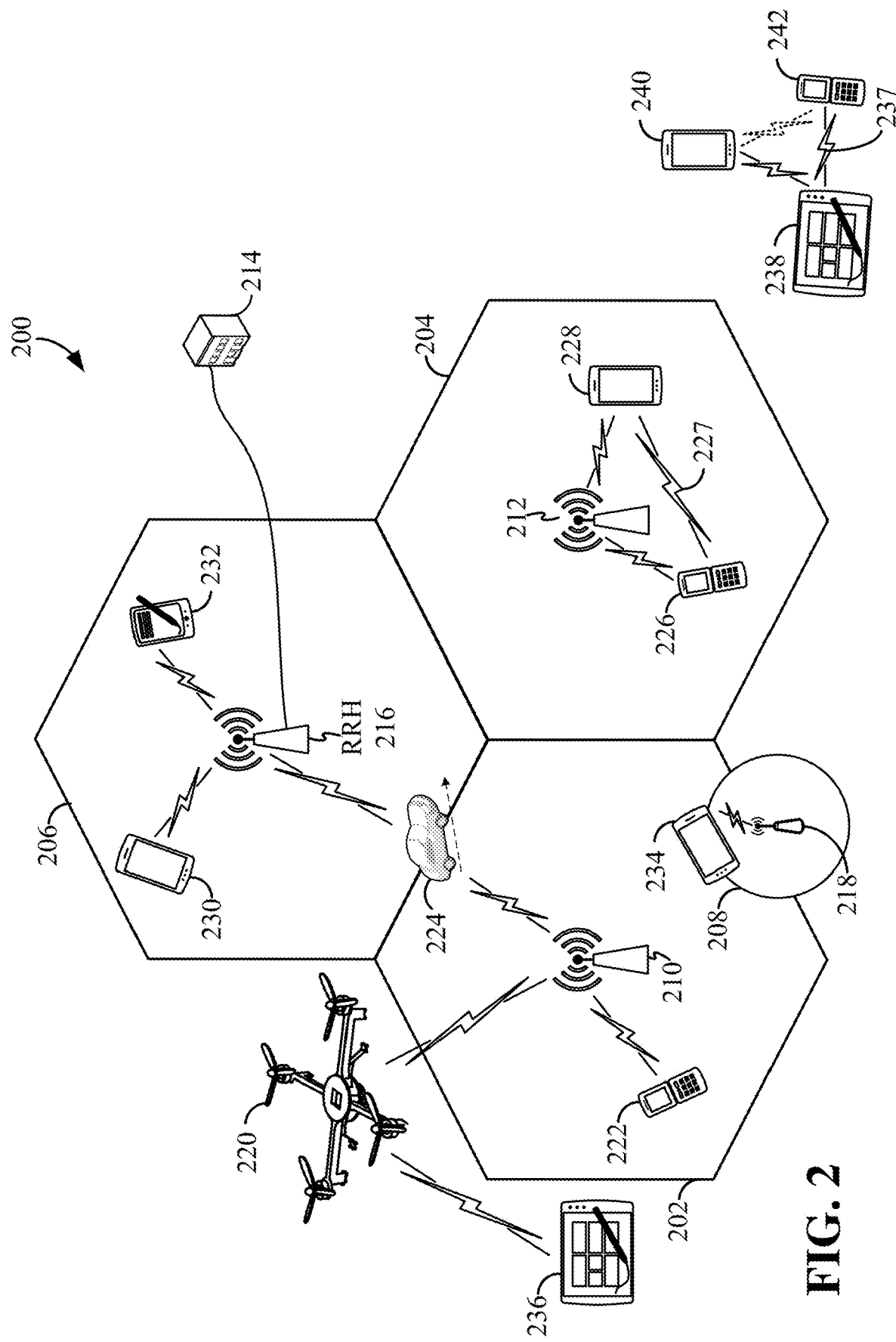
FIG. 2 is an illustration of an example of a radio access network according to some aspects of the disclosure.

FIG. 2 is an illustration of an example of a radio access network (RAN) 200 according to some aspects of the disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two exemplary base stations 210 and 212 are shown in cells 202 and 204; and a third exemplary base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network (e.g., core network 102) for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. The UEs may communicate with the base stations using one or more beams in, for example, FR1 and/or FR2 frequencies.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242)

may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. A spectrum may include one or more frequency bands that may be used for wireless communication. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some aspects of the disclosure, a network node (e.g., a base station or UE) may use a spectrum sensing procedure to gain access to a shared or unlicensed spectrum in a synchronized network (e.g., RAN 200). In a synchronized network, network devices transmit and receive signals based on a synchronized timing, for example, using frame based access. In one example, a spectrum sensing procedure may use a listen-before-talk (LBT) process or procedure that can be a non-scheduled, contention-based multiple access technology where a device monitors or senses a carrier or spectrum (e.g., on one or more beams) before transmitting a signal over the spectrum. Some LBT techniques utilize signaling, such as a request to send (RTS) and a clear to send (CTS), to reserve the channel for a given duration of time. In some examples, the transmitting device may transmit a reservation message to reserve a beam for communicating with another device or network node (e.g., UE) after determining that the spectrum is idle or available, without receiving any beam measurements or feedback from the other device or network node.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
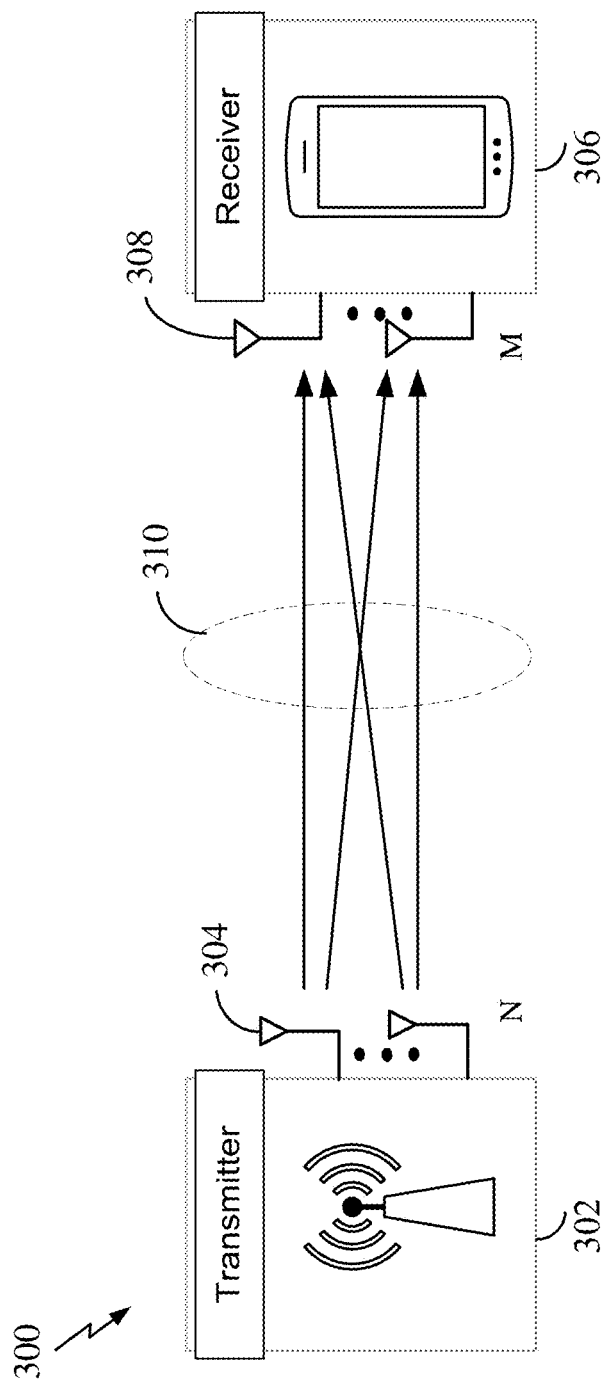
FIG. 3 is a diagram illustrating an example of a wireless communication system configured to support beamformed communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In 5G New Radio (NR) systems, particularly for NR systems using FR2 or higher frequency bands, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems (e.g., FR1). In addition, beamformed signals may further be utilized in D2D systems, such as NR sidelink (SL) or V2X, utilizing FR2.

Figure 4:
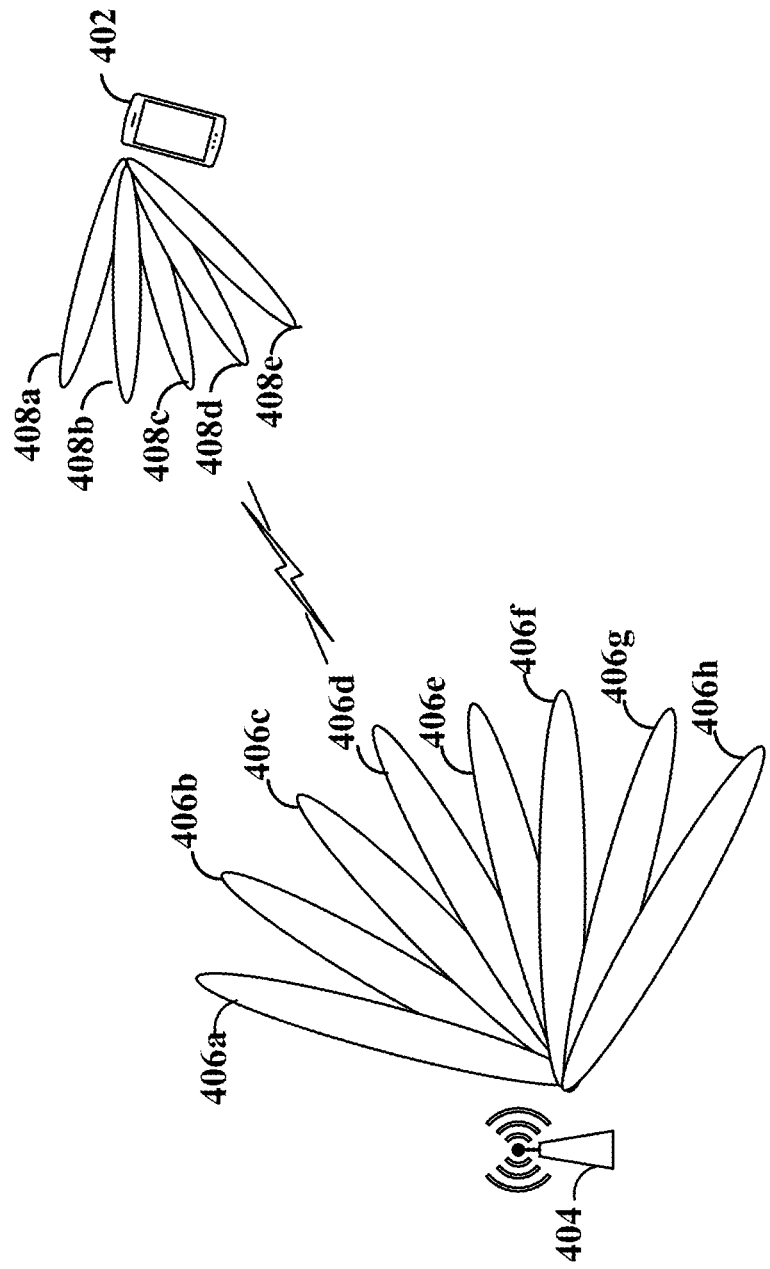
FIG. 4 is a diagram illustrating communication between a base station and user equipment using beamformed signals according to some aspects of the disclosure.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 2, and the UE 402 may be any of the UEs or scheduled entities illustrated in FIGS. 1 and/or 2. In some aspects, the base station 404 may communicate with the UE 402 using a frame-based access mode described herein.

The base station 404 may generally be capable of communicating with the UE 402 using one or more transmit beams, and the UE 402 may further be capable of communicating with the base station 404 using one or more receive beams. As used herein, the term transmit beam refers to a beam on the base station 404 that may be utilized for downlink or uplink communication with the UE 402. In addition, the term receive beam refers to a beam on the UE 402 that may be utilized for downlink or uplink communication with the base station 404.

In the example shown in FIG. 4, the base station 404 is configured to generate a plurality of transmit beams 406a-406h, each associated with a different spatial direction. In addition, the UE 402 is configured to generate a plurality of receive beams 408a-408e, each associated with a different spatial direction. It should be noted that while some beams are illustrated as adjacent to one another, such an arrangement may be different in different aspects. For example, transmit beams 406a-406h transmitted during a same symbol may not be adjacent to one another. In some examples, the base station 404 and UE 402 may each transmit more or less beams distributed in all directions (e.g., 360 degrees) and in three-dimensions. In addition, the transmit beams 406a-406h may include beams of varying beam width. For example, the base station 404 may transmit certain signals (e.g., SSBs) on wider beams and other signals (e.g., CSI-RSs) on narrower beams.

The base station 404 and UE 402 may select one or more transmit beams 406a-406h on the base station 404 and one or more receive beams 408a-408e on the UE 402 for communication of uplink and downlink signals therebetween using a beam management procedure. In one example, during initial cell acquisition, the UE 402 may perform a P1 beam management procedure to scan the plurality of transmit beams 406a-406h on the plurality of receive beams 408a-408e to select a beam pair link (e.g., one of the transmit beams 406a-406h and one of the receive beams 408a-408e) for a physical random access channel (PRACH) procedure for initial access to the cell. For example, periodic SSB beam sweeping may be implemented on the base station 404 at certain intervals (e.g., based on the SSB periodicity). Thus, the base station 404 may be configured to sweep or transmit an SSB on each of a plurality of wider transmit beams 406a-406h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 404 and UE 402 may perform a P2 beam management procedure for beam refinement at the base station 404. For example, the base station 404 may be configured to sweep or transmit a CSI-RS on each of a plurality of narrower transmit beams 406a-406h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 402 is configured to scan the plurality of CSI-RS transmit beams 406a-406h on the plurality of receive beams 408a-408e. The UE 402 then performs beam measurements (e.g., RSRP, SINR, etc.) of the received CSI-RSs on each of the receive beams 408a-408e to determine the respective beam quality of each of the CSI-RS transmit beams 406a-406h as measured on each of the receive beams 408a-408e.

The UE 402 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 406a-406h on one or more of the receive beams 408a-408e to the base station 404. The base station 404 may then select one or more CSI-RS transmit beams on which to communicate downlink and/or uplink control and/or data with the UE 402. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 404 may configure the UE 402 to perform SSB beam measurements and provide an L1 measurement report containing beam measurements of SSB transmit beams 406a-406h. For example, the base station 404 may configure the UE 402 to perform SSB beam measurements and/or CSI-RS beam measurements for beam failure detection (BRD), beam failure recovery (BFR), cell reselection, beam tracking (e.g., for a mobile UE 402 and/or base station 404), or other beam optimization purpose.

In addition, when the channel is reciprocal, the transmit and receive beams may be selected using an uplink beam management scheme. In an example, the UE 402 may be configured to sweep or transmit on each of a plurality of receive beams 408a-408e. For example, the UE 402 may transmit an SRS on each beam in different beam directions. In addition, the base station 404 may be configured to receive the uplink beam reference signals on a plurality of transmit beams 406a-406h. The base station 404 then performs beam measurements (e.g., RSRP, SINR, etc.) of the beam reference signals on each of the transmit beams 406a-406h to determine the respective beam quality of each of the receive beams 408a-408e as measured on each of the transmit beams 406a-406h.

The base station 404 may then select one or more transmit beams on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 406d) on the base station 404 and a single receive beam (e.g., beam 408c) on the UE may form a single BPL used for communication between the base station 404 and the UE 402. In another example, multiple CSI-RS transmit beams (e.g., beams 406c, 406d, and 406e) on the base station 404 and a single receive beam (e.g., beam 408c) on the UE 402 may form respective BPLs used for communication between the base station 404 and the UE 402. In another example, multiple CSI-RS transmit beams (e.g., beams 406c, 406d, and 406e) on the base station 404 and multiple receive beams (e.g., beams 408c and 408d) on the UE 402 may form multiple BPLs used for communication between the base station 404 and the UE 402. In this example, a first BPL may include transmit beam 406c and receive beam 408c, a second BPL may include transmit beam 406d and receive beam 408c, and a third BPL may include transmit beam 406e and receive beam 408d.

Various aspects of the present disclosure can be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
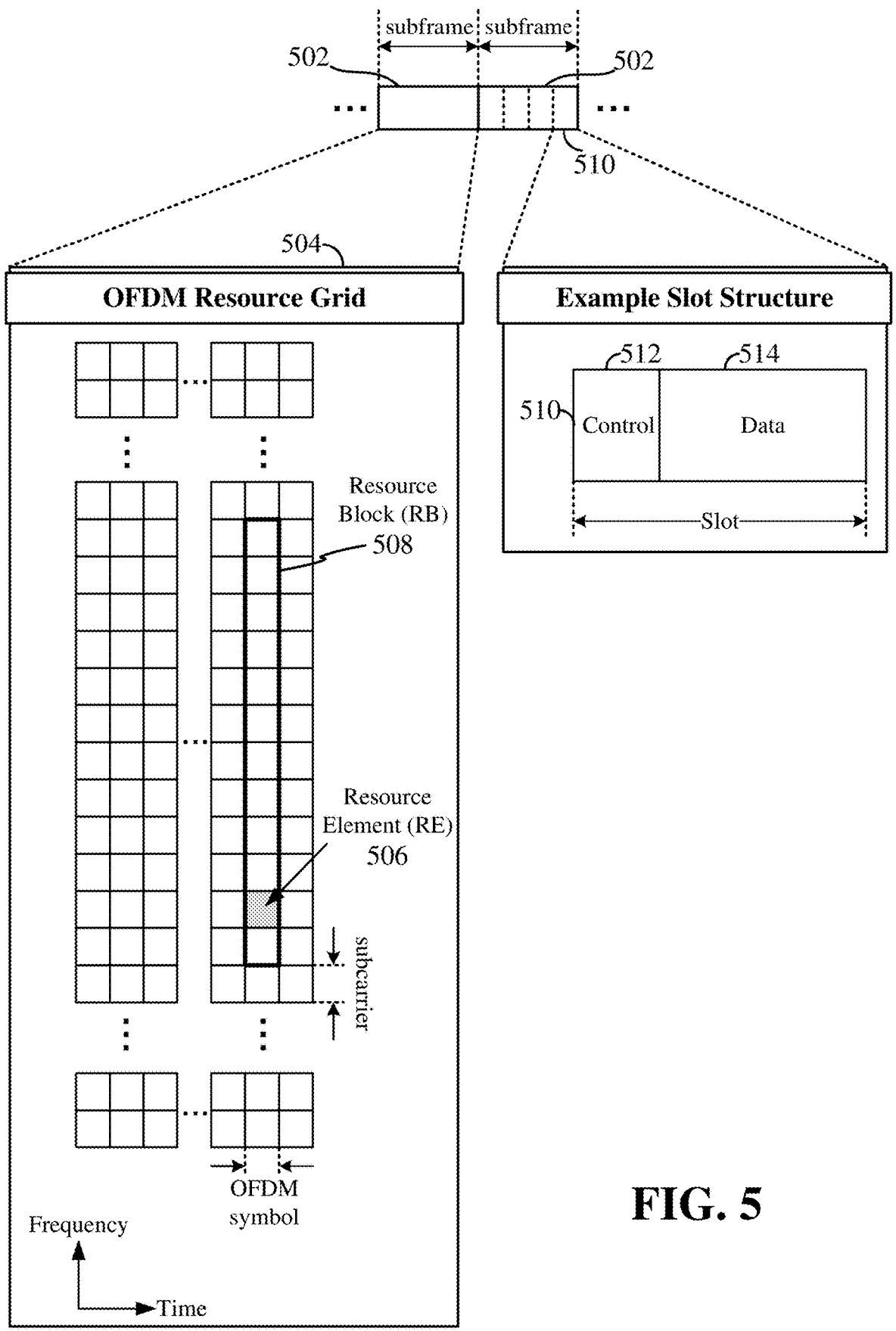
FIG. 5 is a schematic illustration of an organization of wireless resources in an air interface utilizing orthogonal frequency divisional multiplexing (OFDM) according to some aspects of the disclosure.

Referring now to FIG. 5, an expanded view of an exemplary subframe 502 (e.g., DL subframe) is illustrated, showing an OFDM resource grid 504. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones of the carrier.

The resource grid 504 may be used to schematically represent time-frequency resources for a given antenna port. That is, in a MIMO implementation with multiple antenna ports available, a corresponding multiple number of resource grids 504 may be available for communication. The resource grid 504 is divided into multiple resource elements (REs) 506. For example, an RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of scheduled entities (e.g., UEs) for downlink, uplink, or sidelink transmissions typically involves scheduling one or more resource elements 506 within one or more sub-bands or bandwidth parts (BWPs). Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each subframe 502 (e.g., a 1 ms subframe) may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels (e.g., PDCCH), and the data region 514 may carry data channels (e.g., PDSCH or PUSCH). Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within an RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

The channels or carriers described above and illustrated in FIGS. 1, 2, 4, and 5 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 6:
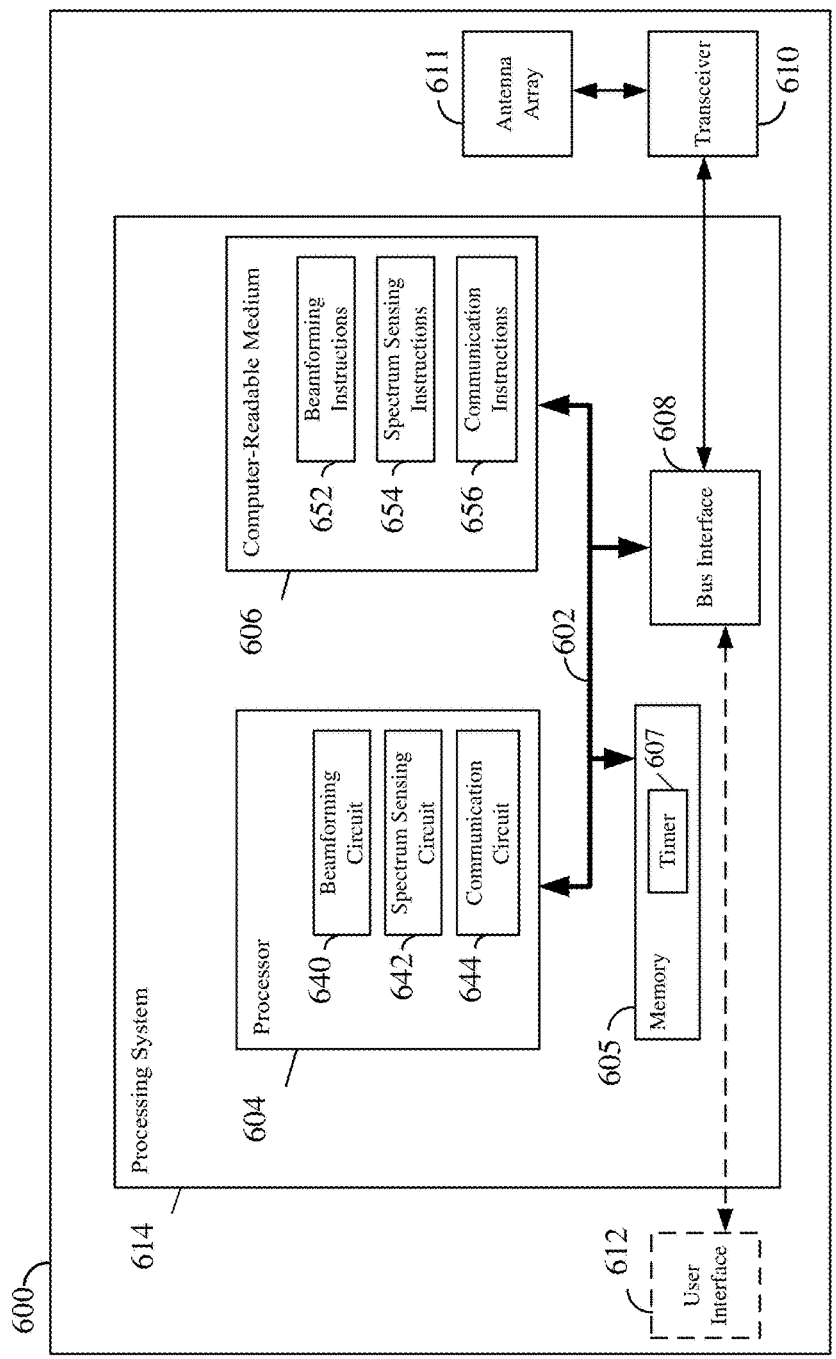
FIG. 6 is a block diagram illustrating an example of a hardware implementation for an apparatus according to some aspects of the disclosure.

FIG. 6 is a block diagram illustrating an example of a hardware implementation for an apparatus 600 employing a processing system 614. For example, the apparatus 600 may be a user equipment (UE) as illustrated in any one or more of FIGS. 1, 2, 4, and/or 12. In another example, the apparatus 600 may be a base station as illustrated in any one or more of FIGS. 1, 2, 4, and/or 12.

The apparatus 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 600 may be configured to perform any one or more of the functions described herein. That is, the processor 604, as utilized in the apparatus 600, may be used to implement any one or more of the processes and procedures described below and illustrated in FIGS. 7-14.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium using one or more antenna arrays 611. An antenna array is a set of connected antenna elements that may work together as a single antenna to transmit or receive radio waves using one or more beams. Depending upon the nature of the apparatus, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include circuitry configured for various functions, including, for example, frame-based spectrum access with Tx-side sensing. For example, the circuitry may be configured to implement one or more of the functions described below in relation to FIGS. 7-14. The circuitry may include a beamforming circuit 640, a spectrum sensing circuit 642, and a communication circuit 644.

The beamforming circuit 640 may be configured to perform various operations used for beamforming in wireless communication described herein. For example, the apparatus may use the beamforming circuit 640 to select a plurality of beams for accessing a spectrum via the transceiver 610 and antenna array 611 using a spectrum sensing procedure. The spectrum sensing circuit 642 may be configured to perform various operations used for sensing a spectrum to determine whether or not the spectrum is idle or available. For example, the apparatus may use the spectrum sensing circuit 642 to perform a spectrum sensing procedure to sense a spectrum on a plurality of beams. The apparatus may use a timer 607 (e.g., countdown timer) to keep track of a time interval used during spectrum sensing.

The communication circuit 644 may be configured to perform various operations used for wireless communication (e.g., UL and DL communication) described herein. For example, the apparatus may use the communication circuit 644 to select one or more transmit beams for accessing a spectrum based on a result of the spectrum sensing procedure, and transmit a signal (e.g., a reservation message) using the selected beam(s) or beam direction(s). The result may include the determination that the spectrum is idle on one or more beams.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include software configured for various functions, including, for example, frame base spectrum access with Tx side sensing. For example, the software may be configured to implement one or more of the functions described in relation to FIGS. 7-14. The software may include beamforming instructions 652, spectrum sensing instructions 654, and communication instructions 656.

The beamforming instructions 652 may cause the apparatus to perform various operations used for beamforming described herein. For example, the beamforming instructions 652 may cause the apparatus to select a plurality of beams for accessing a spectrum using a spectrum sensing procedure. The spectrum sensing instructions 654 may cause the apparatus to perform various spectrum sensing operations described herein. In one example, the spectrum sensing instructions 654 may cause the apparatus to use LBT techniques or the like to sense a spectrum in a plurality of beams.

The communication instructions 656 may cause the apparatus to perform various operations used for wireless communication described herein. For example, the communication instructions 656 may cause the apparatus to select one or more transmit beams for accessing a spectrum based on a result of the spectrum sensing procedure described herein, and transmit a signal using the selected transmit beam(s), for example, to reserve the spectrum.

Figure 7:
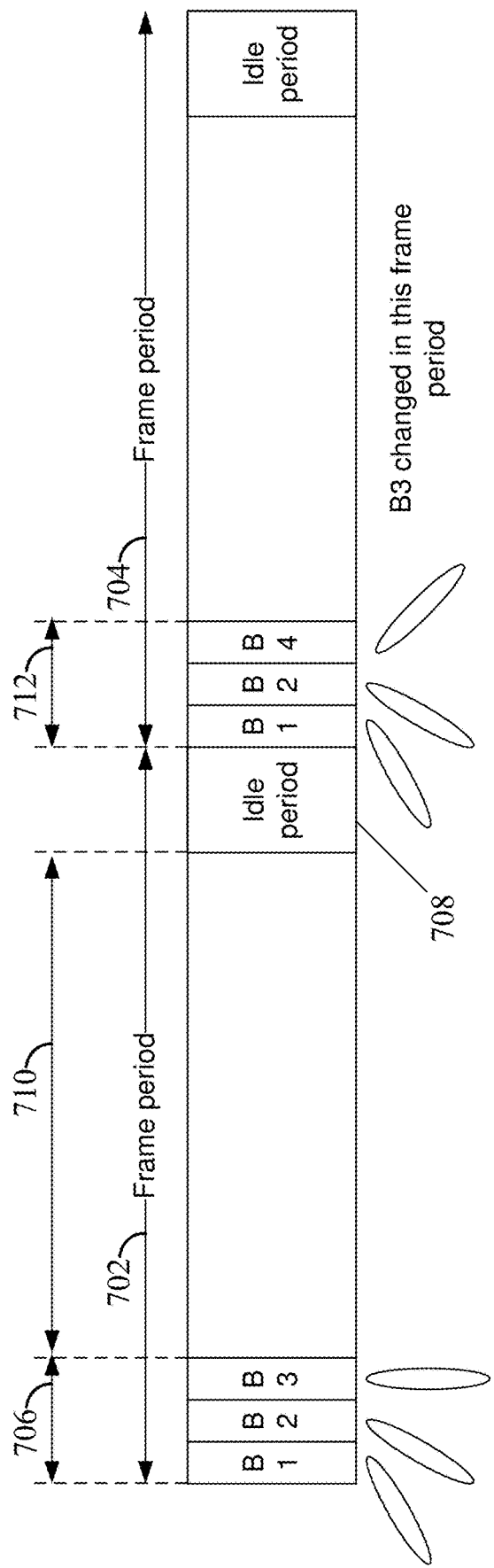
FIG. 7 is a diagram illustrating an exemplary frame structure for using a frame-based channel access mode with transmit (Tx) side only sensing.

In some aspects, network devices can use a frame-based channel access mode to access a wireless network (e.g., RAN 200) in which access to the network is synchronized based on frame timing. FIG. 7 is a diagram illustrating an exemplary frame structure for using a frame-based channel access mode with transmit-side (Tx-side) only sensing. A transmitting device (e.g., gNB or UE) may use a spectrum sensing procedure (e.g., LBT techniques) to gain channel access to a shared or unlicensed spectrum. To that end, the transmitting device may sense the spectrum on different beams or beam directions in each frame period to determine whether or not the spectrum is idle (e.g., available, free, or otherwise not in use by other transmitting devices). Two exemplary frame periods 702 and 704 are shown in FIG. 7 for illustrating a frame-based access mode. Each frame period may have a fixed or predetermined duration. Each frame period includes a sensing period 706 (sensing interval) at the beginning of the frame and an idle period 708 at the end of the frame. If a transmitting device successfully gained access to the spectrum through spectrum sensing, the transmitting device may transmit a signal to a receiver in a time interval 710 between the sensing period 706 and idle period 708.

The idle period 708 is a time period in which all or at least some network nodes or entities refrain from transmitting so that devices of another wireless network or RAN sharing the spectrum may gain access to the shared spectrum. In one aspect of the disclosure, all network nodes refrain from transmitting in the idle period for all beams. In another aspect of the disclosure, the idle period may be applied on a per beam or beam group basis. In this case, during the idle period, the transmitting device can transmit on one or more beams and does not transmit on one or more other beams.

In some aspects of the disclosure, the sensing period 706 may include multiple sensing slots in the time domain that provide multiple sensing opportunities on different beams in a time division multiplexing (TDM), spatial division multiplexing (SDM), or frequency division multiplexing (FDM) fashion. FIG. 7 illustrates an example of a sensing period using TDM. A sensing slot is a predetermined time interval for sensing the spectrum to determine if the spectrum is being used by other transmitting device(s) (e.g., UEs or base stations). The transmitting device may sense the spectrum on different beams using the sensing slots. In the first frame period 702, the transmitting device may sense or detect transmissions or beams from other devices (e.g., other UEs or base stations) to determine whether or not the spectrum is idle or available. In this example, the sensing period 706 has three sensing slots. The transmitting device may use the first sensing slot to sense the spectrum on a first beam B1, the second sensing slot to sense the spectrum on a second beam B2, and the third sensing slot to sense the spectrum on a third beam B3. In the second frame period 704, the transmitting device may use the sensing period 712 to sense the same beams used in the first frame period 702 or sense one or more different beams. In one example, the transmitting device may sense the same beams B1 and B2 in both sensing periods, but beam B3 in the first sensing period 706 and beam B4 in the second sensing period 712.

In some examples, the network may configure an upper bound on the number of sensing slots (T) that can be included in a frame period. A transmitting device can sense up to K beams per time instance (e.g., a sensing slot) per antenna panel or array. An antenna panel can detect or sense a predetermined beam or beam direction. A transmitting device (e.g., gNB or UE) needing to access the spectrum may choose up to K*T beam(s) for channel sensing.

Figure 8:
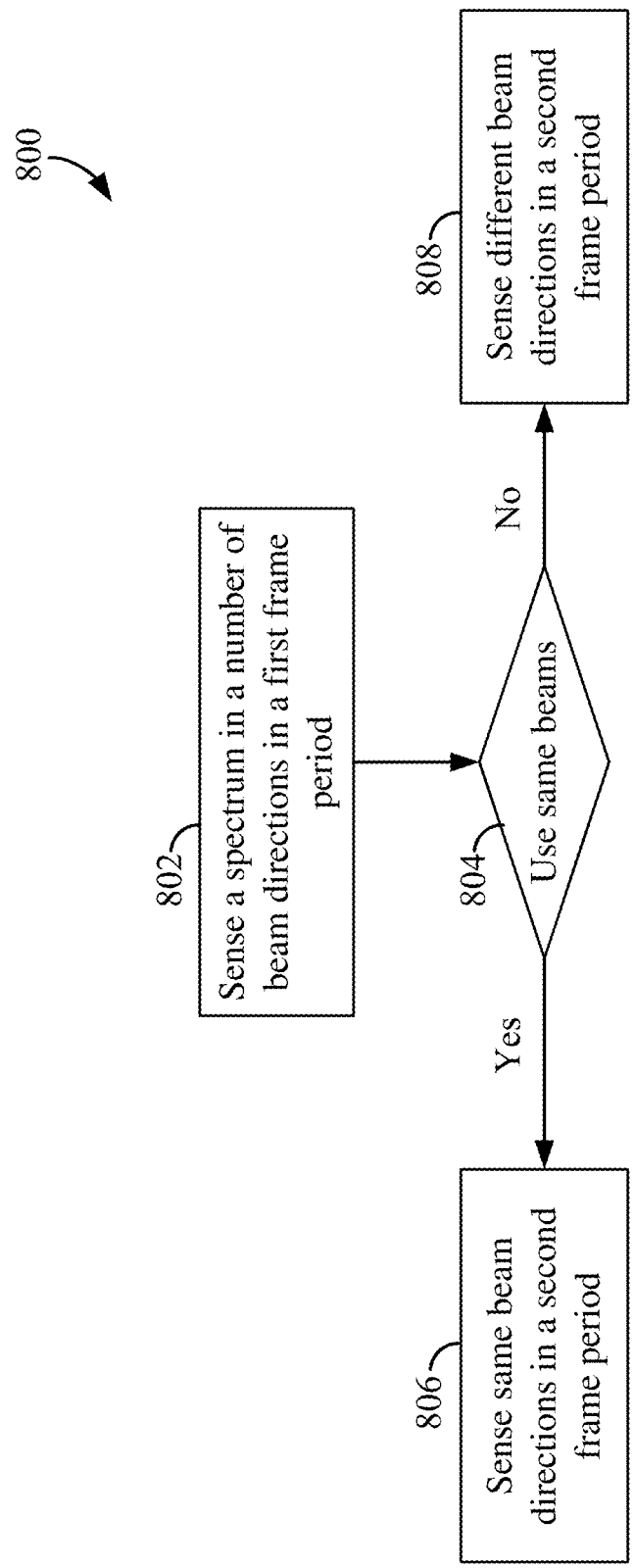
FIG. 8 is a flow chart illustrating an exemplary method for determining a beam sensing order for a frame-based channel access mode according to some aspects of the disclosure.

FIG. 8 is a flow chart illustrating an exemplary method 800 for determining a beam sensing order according to some aspects of the disclosure. In some examples, the method may be carried out by a transmitting device (e.g., gNB or UE) using the frame-based channel access mode as described above in relation to FIG. 7. At block 802, a transmitting device senses a spectrum on a number of beams (e.g., Tx beam or Rx beam) in a first frame period. For example, the first frame period may be the same as the first frame period 702 of FIG. 7. In one example, the transmitting device can sense the spectrum on a number of beams (e.g., beams B1, B2, and B3) using a sensing period 706 of the first frame period. During sensing, the transmitting device can determine the signal strength or energy, if detected, of the beams in their respective sensing slots of the sensing period.

At decision block 804, the transmitting device can determine whether to sense the spectrum using the same beams in a second frame period after the first frame period. For example, the second frame period may be the same as the second frame period 704 of FIG. 7. If the transmitting device determines to sense the same beams, the method proceeds to block 806; otherwise, if the transmitting device determines to sense one or more different beams, the method proceeds to block 808.

At block 806, the transmitting device senses the same beams (e.g., B1, B2, and B3) again in the second frame period. In one aspect of the disclosure, the transmitting device may sense the same beams B1, B2, and B3 in the second frame period using the same sensing order or pattern (e.g., B1 in sensing slot 1, B2 in sensing slot 2, then B3 in sensing slot 3) that was used in the first frame period. In some aspects of the disclosure, the transmitting device may use different beam sensing orders or patterns to sense the same beams in different frame periods.

In one aspect, the transmitting device may change the beam sensing sequence based on a round-robin pattern or algorithm. For example, the sensing sequence of the beams of a certain frame period may be derived from the sensing sequence of the same beams in an earlier frame period. In one example, the transmitting device may use the beam order B1, B2, and B3 in a first frame period; the beam order B2, B3, and B1 in a second frame period after the first frame period; and the beam order B3, B1, and B2 in a third frame period after the second frame period.

In one aspect, the transmitting device may randomize the beam sensing sequence in each frame period so that the beam sensing orders between the frame periods do not have any particular sensing orders or patterns. Randomizing or randomly changing the beam sensing orders or patterns can enable the transmitting device to detect and/or avoid a periodic interferer that shares the same spectrum and can use one or more particular beams.

At block 808, the transmitting device senses the spectrum using different beams in the second frame period. The transmitting device may select a set of beams that are different from the set of beams sensed in the first frame period. For example, the transmitting device may be capable of using X number of beams (e.g., beams B1, B2, B3, and B4) for wireless communication. The transmitting device may sense the spectrum using a first subset (e.g., beams B1, B2, and B3) of the X number of beams in the first frame period, and sense a second subset (e.g., beams B1, B2, and B4) of the X number of beams in the second frame period. The first subset and the second subset have at least one different beam.

Figure 9:
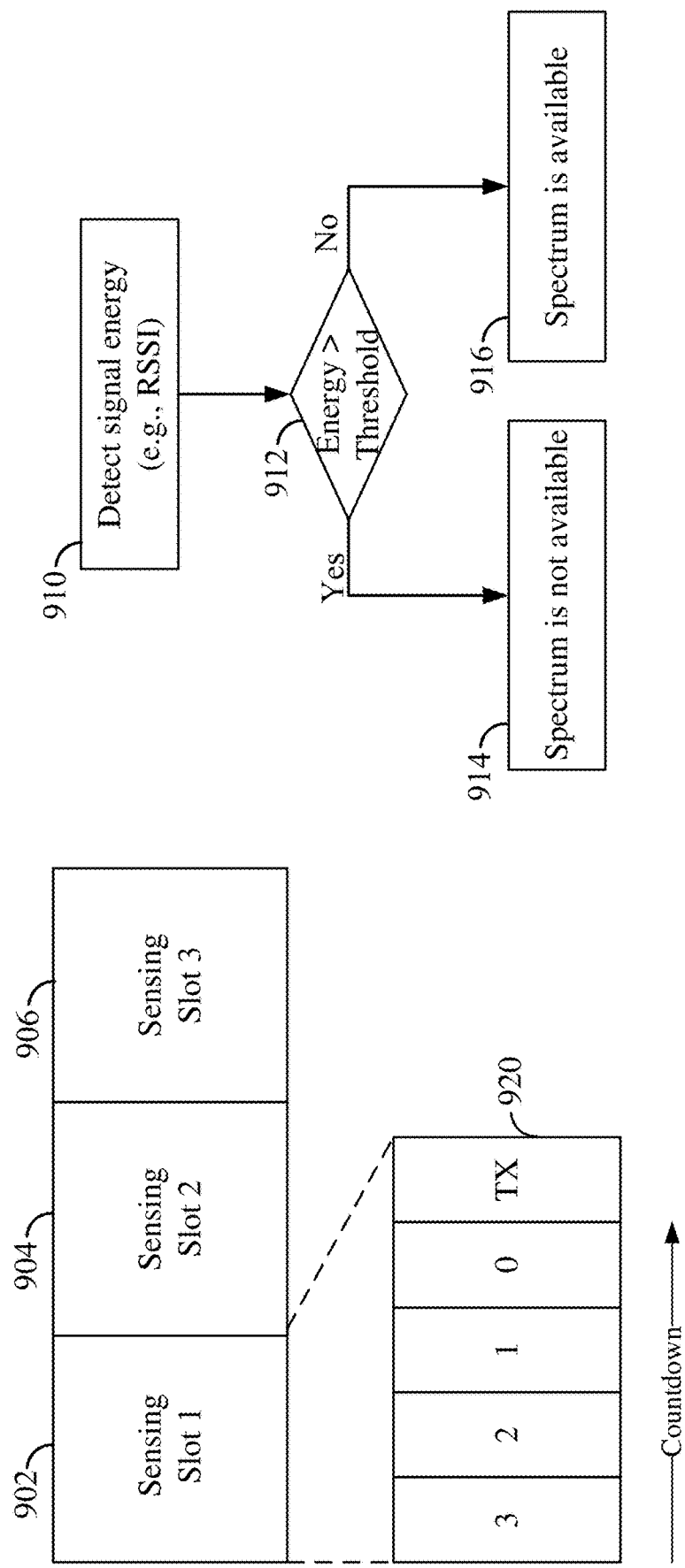
FIG. 9 is a diagram illustrating a first exemplary spectrum sensing procedure according to some aspects of the present disclosure.

FIG. 9 is a diagram illustrating an exemplary spectrum sensing procedure according to some aspects of the present disclosure. In one example, a transmitting device (e.g., gNB or UE) may perform a spectrum sensing procedure or process in each sensing slot of a sensing period to determine if a channel is idle or a beam is available. In some examples, the spectrum sensing procedure may include a listen-before-talk (LBT) procedure that may or may not use random back-off when contention is detected. Three exemplary sensing slots 902, 904, and 906 are illustrated in FIG. 9. In one example, these sensing slots may correspond to the sensing slots in the sensing period 706 or 712 illustrated in FIG. 7. In each sensing slot, the transmitting device may perform the spectrum sensing procedure to determine if the beam associated with the sensing slot is silent or not used by other transmitting devices (e.g., UE or gNB) that may or may not belong to the same network. For example, the spectrum sensing procedure may include a clear channel assessment (CCA) of the channel. During CCA, the transmitting device can listen or detect the signal energy of any signal or beam transmitted from other devices, for example, network nodes of a different network sharing the same spectrum.

At block 910, the transmitting device may detect the signal energy within a particular beam associated with the current sensing slot. For example, the transmitting device may use an antenna panel or array that is configured to detect the wireless signal energy of certain beam(s). At decision block 912, the transmitting device determines whether or not the signal energy is greater than a predetermined threshold. At block 914, if the detected signal energy (e.g., received signal strength indicator (RSSI)) is greater than the predetermined threshold, the spectrum (e.g., channel or beam) is considered idle or available. However, at block 916, if the detected signal energy (e.g., RSSI) is not greater than the predetermined threshold, the spectrum is considered busy or not available.

In one aspect, the transmitting device may use a countdown timer in the spectrum sensing procedure to determine whether the spectrum or beam is idle. In the example shown in FIG. 9, the countdown timer can count down from 3 to 0 corresponding to a predetermined time duration. In other examples, the countdown timer may be configured to use any desired duration. If the detected signal energy stays below the energy threshold throughout the countdown, the transmitting device considers the sensed channel or beam to be idle and may transmit a reservation message or signal 920 to reserve the sensed channel or beam. In some aspects, the reservation message 920 may be any predetermined message or signal that is designed to notify the receiving devices that the channel is reserved by the transmitting device. For example, the reservation message may be a transmission or message on a physical downlink control channel (PDCCH) or a physical sidelink control channel (PSSCH). The transmitting device may repeat the above-described spectrum sensing procedure in each sensing slot (sensing slots 904 and 906) for different beams. In some aspects, the energy threshold may be the same for all beams. In some aspects, the transmitting device may use different thresholds for different beams.

Figure 10:
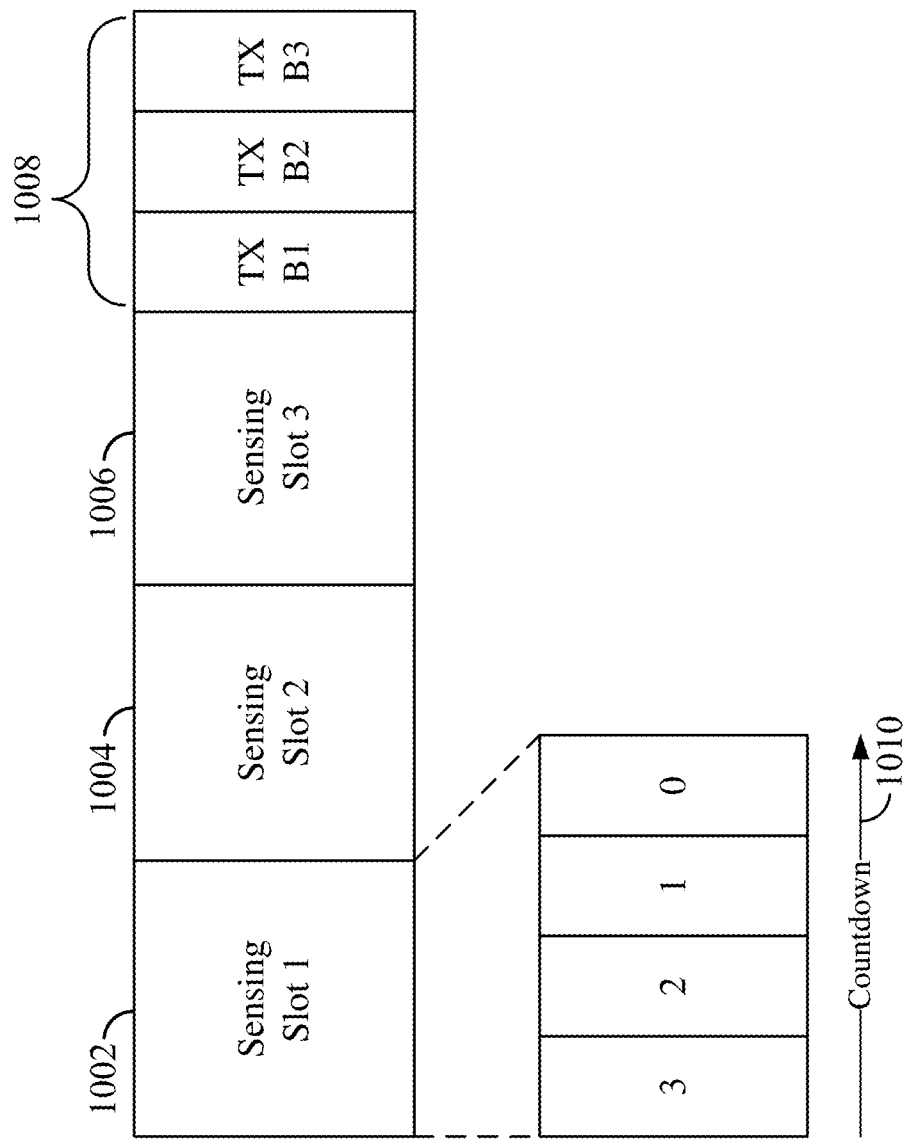
FIG. 10 is a diagram illustrating a second exemplary spectrum sensing procedure according to some aspects of the present disclosure.

FIG. 10 is a diagram illustrating another exemplary spectrum sensing procedure according to some aspects of the present disclosure. In one example, a transmitting device (e.g., gNB or UE) may perform a spectrum sensing procedure or process in each sensing slot of a sensing period to determine if beam is idle or free for access, for example, for accessing a communication channel between the transmitting device and a receiving device. Three exemplary sensing slots 1002, 1004, and 1006 are illustrated in FIG. 10. In this example, the transmitting device may sense the spectrum on beams B1, B2, and B3 in the sensing slots 1, 2, and 3, respectively. If the transmitting device determines that any of the beams B1, B2, and B3 are available, the transmitting device transmits corresponding reservation messages 908 (illustrated as Tx B1, Tx B2, Tx B3 in FIG. 10) to reserve the beams. Different from the example described above in relation to FIG. 9, the transmitting device completes the sensing in all the sensing slots before transmitting the reservation messages 1008 across the clear beams to reserve the spectrum. Similar to the example of FIG. 9, the transmitting device may use a countdown counter 1010 to determine whether or not a beam or channel is silent or idle in each sensing slot during a predetermined duration.

Figure 11:
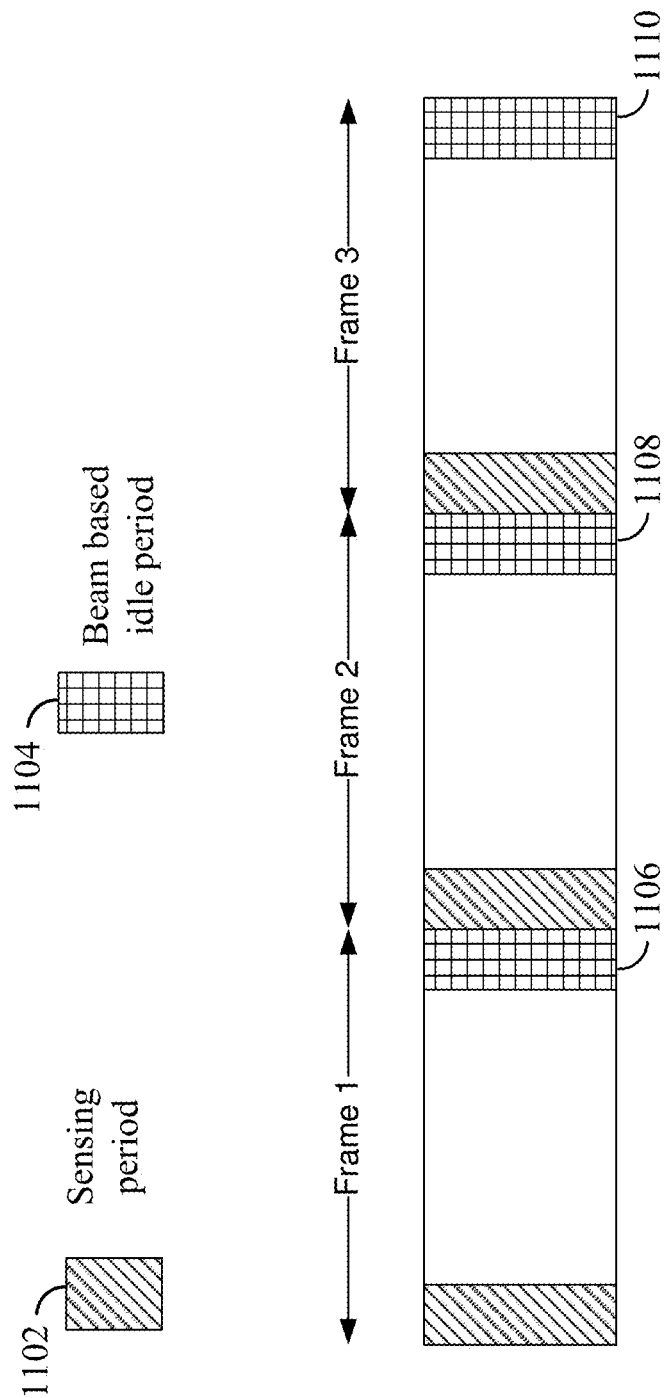
FIG. 11 is a diagram illustrating an exemplary beam based idle period operation according to some aspects of the disclosure.

FIG. 11 is a diagram for illustrating an exemplary beam based idle period operation. Three exemplary frame periods are illustrated in FIG. 11. These frame periods may be the same as the frame periods described above in relation to FIG. 7. Each frame period has a sensing period 1102 and an idle period 1104. During the sensing period 1102, a transmitting device (e.g., gNB or UE) may sense the spectrum on one or more beams, for example, using LBT techniques as described above. In one aspect, no transmission is allowed in the idle periods 1104 to facilitate spectrum sharing with other networks. In some aspects, the idle periods 1104 may operate on a per beam or beam group basis. When the idle periods operate on a per beam basis, no transmission is allowed for a predetermined beam out of all supported beams, and different idle periods may forbid transmission of different beams. In a per beam example, no transmission is allowed for a first beam (e.g., B1) in the idle period 1106 of frame 1, no transmission is allowed for a second beam (e.g., B2) in the idle period 1108 of frame 2, and no transmission is allowed for a third beam (e.g., B3) in the idle period 1110 of frame 3.

In some aspects, the idle period may operate on beam groups. In one example, a beam group may include a beam carrying a synchronization signal block (SSB) and other beams that are quasi co-located with the SSB beam. Two beams are quasi co-located when the beams exhibit similar channel condition. Therefore, the channel information estimated to detect one beam can help detect the other beam as well. An SSB carries the primary synchronization signal (PSS), secondary synchronization signal (SSS), and PBCH. In each idle period, a transmitting device cannot transmit in a predetermined beam group, but can transmit in other beam groups. Different idle periods can forbid the transmission of different beam groups. Per beam or beam group-based application of the idle periods may promote more efficient use of the spectrum for beam-based transmission. An interferer can still gain spectrum access during the idle periods due to the directional nature of beam-based transmission. In some aspects of the disclosure, an idle period for a specific beam may be configured in multiple consecutive frame periods (e.g., two or more frame periods). For example, referring to FIG. 11, a transmitting device cannot transmit on the same beam in the idle periods 1106 and 1108 of two consecutive frame periods.

Figure 12:
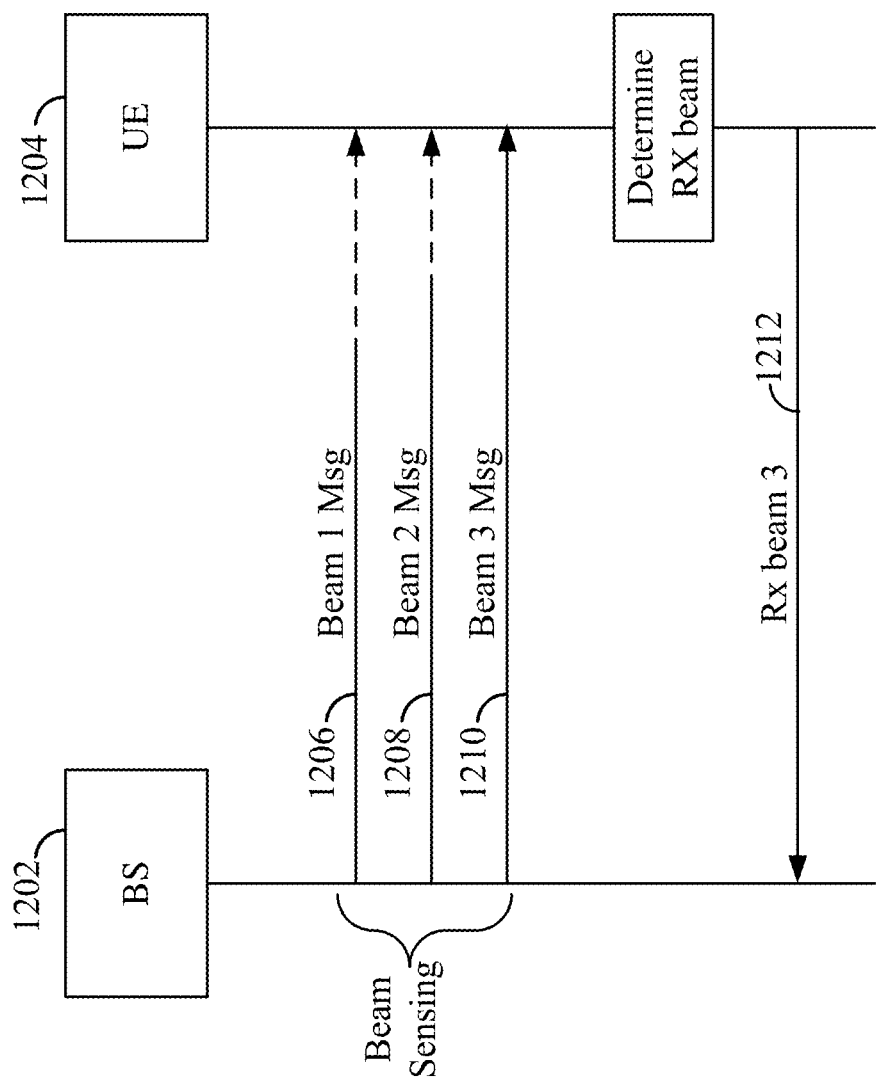
FIG. 12 is a diagram illustrating exemplary beam-based communication between a base station and a user equipment using a frame-based channel access mode according to some aspects of the disclosure.

FIG. 12 is a diagram illustrating exemplary beam-based communication between a base station 1202 and a user equipment (UE) 1204 according to some aspects of the disclosure. The base station 1202 may be any of the base stations or scheduling entities described above in relation to FIG. 1-4. The UE 1204 may be any of the UEs or scheduled entities described above in relation to FIG. 1-4. The base station 1202, as a transmitting device, may use the frame-based access mode described above to gain access to a wireless spectrum (e.g., FR4 spectrum) that may be shared with another wireless network. For example, the base station 1202 may determine that three beams (e.g., beams B1, B2, and B3) are idle or free during a sensing period of a frame. Therefore, the base station 1202 can transmit a reservation signal or message on each beam to reserve the corresponding Tx beam for the current frame using a frame-based channel access mode. For example, the base station 1202 transmits a first beam reservation message 1206 (Beam 1 Msg) on beam B1, a second beam reservation message 1208 (Beam 2 Msg) on beam B2, and a third beam reservation message 1210 (Beam 3 Msg) on beam B3. These beam reservation messages notify other network nodes (e.g., UE 1204) that the base station is reserving these beams for a frame period.

If the UE 1204 receives the reservation message on a Tx beam from the base station 1202, the UE may communicate with the base station 1202 using a receive (Rx) beam corresponding to the Tx beam. For example, if the UE 1204 receives a Tx beam B3 from the base station 1202, the UE may transmit to the base station 1202 using an Rx beam B3 that has a beam direction corresponding to the Tx beam B3. In this case, the Tx beam and Rx beam can form a beam pair link (BPL). In some examples, the UE 1204 may transmit a scheduling request (SR), a buffer status report (BSR), a sounding reference signal (SRS), PUCCH, PUSCH, etc., using the Rx beam. If the UE does not receive a reservation message from the base station (e.g., at least within the first X slots/symbols of a communication frame or slot), then the UE can consider that no beam is available to communicate with the base station.

In some aspects, the UE may transmit to the base station without first receiving a Tx beam reservation message from the base station. In some cases or exceptions, the UE may transmit a signal or channel related to some critical functions of the UE, for example, beam management, link establishment, maintenance, etc. In one aspect of the disclosure, an exception may be defined for a physical channel or signal, for example, a physical random access channel (PRACH) that is used in an initial access procedure, such as a random access procedure (RACH). In another aspect of the disclosure, an exception may be defined for a specific function, for example, BSR reporting and SR transmission. In another example, an exception may be defined for beam management SRS transmission, not including SRS for channel state information (CSI) reporting.

In some aspects of the disclosure, if a transmitting device (e.g., a base station or UE) detects interference during spectrum sensing, the transmitting device may share the information with other network nodes to facilitate beam management across the network. In some aspects of the disclosure, upon detection of a persistent interferer using the above described frame-based access mode, a transmitting device can switch to another spectrum access mode, for example, Rx-assisted spectrum access in which the receiver may send a report back to the transmitting device regarding interference detected by the receiver.

Figure 13:
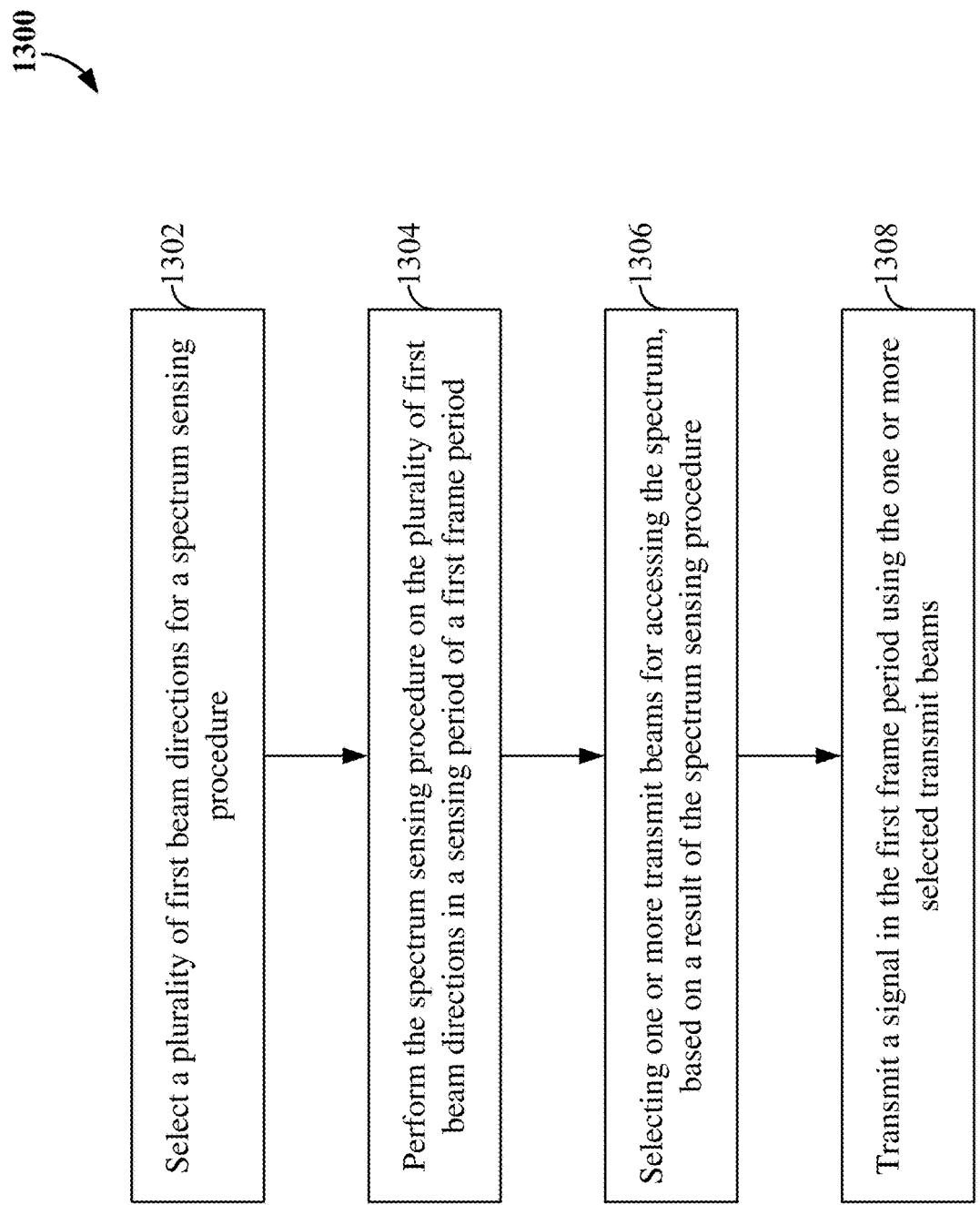
FIG. 13 is a flow chart illustrating an exemplary process for frame-based channel access using Tx sensing according to some aspects of the present disclosure.

FIG. 13 is a flow chart illustrating an exemplary process 1300 for frame-based channel access using Tx-only sensing according to some aspects of the present disclosure. As described below, some or all illustrated features may be omitted in a particular implementation within the scope of the present disclosure, and some illustrated features may not be required for the implementation of all examples. In some examples, the process 1300 may be carried out by apparatus 600 illustrated in FIG. 6. In some examples, the process 1300 may be carried out by any suitable apparatus or means for carrying out the functions or algorithms described below.

At block 1302, an apparatus selects a plurality of first beams for performing a spectrum sensing procedure to access a spectrum. In some aspects, the first beams may be beams using FR2 frequencies. For example, the beamforming circuit 640 (see FIG. 6) can provide the means for selecting the first beams (e.g., beams B1, B2, and B3 shown in a frame period 702 of FIG. 7). The apparatus may select a subset of beams supported by the apparatus for performing the spectrum sensing procedure in a frame period. In one example, the first beams may include beams directed toward one or more predetermined directions. The apparatus may select the beams based on the known, estimated, and/or predicted locations of other devices or network nodes that may communicate with the apparatus.

At block 1304, the apparatus performs the spectrum sensing procedure on the plurality of first beams in a sensing period of a first frame period. In one aspect, the spectrum sensing procedure may include an LBT procedure described above in relation to FIGS. 9 and 10. For example, the spectrum sensing circuit 642 can provide the means for performing the spectrum sensing procedure in the sensing period 706 of a frame period 702 (see FIG. 7). The sensing period 706 has a number of sensing slots, and the apparatus may perform the spectrum sensing procedure for each beam in a corresponding sensing slot.

In the spectrum sensing procedure, the apparatus can sense a spectrum on a plurality of first beams on a first frame of a plurality of frames (e.g., frame periods 702 and 704 of FIG. 7). Each of the plurality of frames include a sensing period (e.g., sensing periods 706 and 712 of FIG. 7) for sensing the spectrum and an idle period (e.g., idle period 708) for facilitating spectrum sharing with another wireless network.

Figure 14:
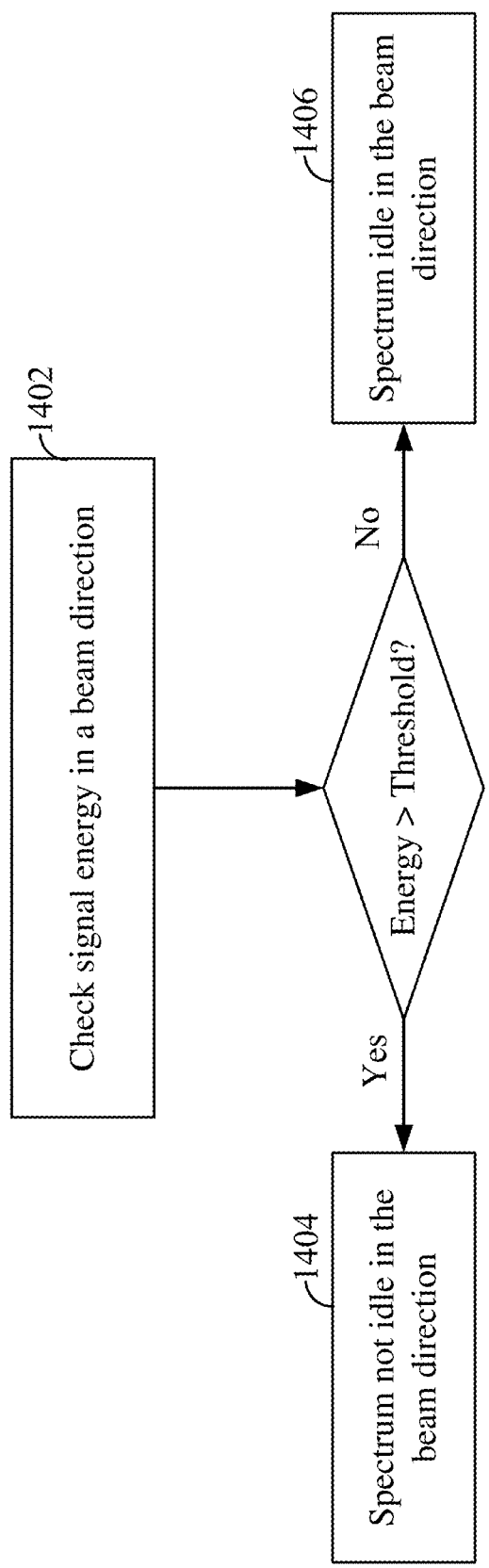
FIG. 14 is a diagram illustrating a clear channel assessment (CCA) procedure according to one aspect of the disclosure.

In some aspects, the apparatus may determine that a channel or spectrum in a certain beam direction or beam is available based on the result of a clear channel assessment (CCA) procedure. FIG. 14 is a diagram illustrating a CCA procedure according to one aspect of the disclosure. At block 1402, the apparatus may check the signal energy (e.g., RSSI) detected for a beam. At block 1404, if the signal energy is greater than a threshold, the apparatus determines that the channel is not idle or available in the direction of the beam. When the apparatus determines that a beam direction is not idle or available, it may indicate that another device is using the spectrum in the same or similar beam direction. At block 1406, if the signal energy is not greater than a threshold, the apparatus determines that the channel is idle or available in the direction of the beam.

Referring back to FIG. 13, at block 1306, the apparatus selects one or more transmit beams for accessing the spectrum, based on a result of the spectrum sensing procedure. The apparatus may sense the spectrum in the sensing period of the first frame (e.g., first frame period 702). In some examples, the transmit beams may be beams using FR2 frequencies. The communication circuit 344 and/or the beamforming circuit 340 can provide the means for selecting the transmit beams. The result of the spectrum sensing procedure may indicate one or more beams that are idle, or one or more beams are available. For example, a beam is idle or available when the apparatus cannot detect a signal with an energy greater than a predetermined threshold on the beam as described above in relation to FIG. 14.

At block 1308, the apparatus transmits a signal in the first frame period using the one or more selected transmit beams. The apparatus can transmit the signal between the sensing period (e.g., sensing period 706) and idle period (e.g., idle period 708) of the frame (e.g., frame period 702). For example, the communication circuit 344 can provide the means for transmitting a signal via the transceiver 310 on one or more beams.

In one configuration, the apparatus 600 for wireless communication includes means for performing the various functions and processes described in relation to FIGS. 7-14. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1-4 and/or 12, and utilizing, for example, the processes and/or algorithms described herein in relation to FIGS. 7-14.

Several aspects of a wireless communication network have been presented with reference to an exemplary implementation. As those skilled in the art will readily appreciate, various aspects described throughout this disclosure may be extended to other telecommunication systems, network architectures and communication standards.

Some aspects of the disclosure are described below.

In a first aspect, a method of wireless communication is operable at a transmitting device in a wireless network. The method includes: sensing a spectrum on a plurality of first beams in a first frame of a plurality of frames, each of the plurality of frames comprising a sensing period for sensing the spectrum and an idle period for facilitating spectrum sharing with another wireless network; selecting one or more beams of the plurality of first beams based on a result of sensing the spectrum in the sensing period of the first frame; and transmitting a signal in the first frame using the one or more beams in a time interval between the sensing period and the idle period of the first frame.

In a second aspect, alone or in combination with the first aspect, the method further comprises: sensing the spectrum on a plurality of second beams in a second frame of the plurality of frames, wherein the plurality of second beams comprise at least one beam outside of the plurality of first beams.

In a third aspect, alone or in combination with any of the first to second aspects, the method further comprises: sensing the spectrum on the plurality of first beams in a second frame of the plurality of frames, wherein the sensing of the plurality of first beams follows a first sequence of the plurality of first beams in the first frame and a second sequence of the plurality of first beams in the second frame, the first sequence being different from the second sequence.

In a fourth aspect, alone or in combination with the third aspect, the method further comprises: determining the first sequence by randomly selecting a sensing order of the plurality of first beams in the first frame; and determining the second sequence by randomly selecting a sensing order of the plurality of first beams in the second frame.

In a fifth aspect, alone or in combination with the third aspect, the method further comprises deriving the second sequence from the first sequence based on a round-robin algorithm.

In a sixth aspect, alone or in combination with any of the first to fifth aspects, wherein: the sensing period comprises a plurality of sensing slots; and the sensing the spectrum comprises sensing the spectrum using a different beam of the plurality of first beams in a different respective sensing slot of the plurality of sensing slots.

In a seventh aspect, alone or in combination with the sixth aspect, the method further comprises: transmitting one or more reservation messages in the plurality of sensing slots to reserve the one or more beams for communication in the first frame; or transmitting one or more reservation messages after the plurality of sensing slots to reserve the one or more beams for communication in the first frame.

In an eighth aspect, alone or in combination with any of the first to seventh aspects, the method further comprises: refraining from transmitting a signal associated with a predetermined beam or beam group of the wireless network during the idle period.

In a ninth aspect, alone or in combination with the eighth aspect, the method further comprises: transmitting a signal using at least one different beam outside of the predetermined beam or beam group during the idle period.

In a tenth aspect, alone or in combination with any of the first to ninth aspects, wherein the selecting the one or more beams comprises: selecting the one or more beams without receiving a feedback on the one or more beams from another network node.

In an eleventh aspect, an apparatus for wireless communication, comprises: a communication interface configured to access a spectrum of a wireless network; a memory; and a processor operatively coupled with the communication interface and the memory. Wherein the processor and the memory are configured to: sense the spectrum on a plurality of first beams in a first frame of a plurality of frames, each of the plurality of frames comprising a sensing period for sensing the spectrum and an idle period for facilitating spectrum sharing with another wireless network; select one or more beams of the plurality of first beams based on a result of sensing the spectrum in the sensing period of the first frame; and transmit a signal in the first frame using the one or more beams in a time interval between the sensing period and the idle period of the first frame.

In a twelfth aspect, alone or in combination with the eleventh aspect, wherein the processor and the memory are further configured to: sense the spectrum on a plurality of second beams in a second frame of the plurality of frames, wherein the plurality of second beams comprise at least one beam outside of the plurality of first beams.

In a thirteenth aspect, alone or in combination with any of the eleventh to twelfth aspects, wherein the processor and the memory are further configured to: sense the spectrum on the plurality of first beams in a second frame of the plurality of frames, wherein the sensing of the plurality of first beams follows a first sequence of the plurality of first beams in the first frame and a second sequence of the plurality of first beams in the second frame, the first sequence being different from the second sequence.

In a fourteenth aspect, alone or in combination with the thirteenth aspect, wherein the processor and the memory are further configured to: determine the first sequence by randomly selecting a sensing order of the plurality of first beams in the first frame; and determine the second sequence by randomly selecting a sensing order of the plurality of first beams in the second frame.

In a fifteenth aspect, alone or in combination with the thirteenth aspect, wherein the processor and the memory are further configured to: derive the second sequence from the first sequence based on a round-robin algorithm.

In a sixteenth aspect, alone or in combination with any of the eleventh to fifteenth aspects, wherein the processor and the memory are further configured to: sense the spectrum using a different beam of the plurality of first beams in a different respective sensing slot of a plurality of sensing slots in the sensing period.

In a seventeenth aspect, alone or in combination with the sixteenth aspect, wherein the processor and the memory are further configured to: transmit one or more reservation messages in the plurality of sensing slots to reserve the one or more beams for communication in the first frame; or transmit one or more reservation messages after the plurality of sensing slots to reserve the one or more beams for communication in the first frame.

In an eighteenth aspect, alone or in combination with any of the eleventh to seventeenth aspects, wherein the processor and the memory are further configured to: refrain from transmitting a signal associated with a predetermined beam or beam group of the wireless network during the idle period.

In a nineteenth aspect, alone or in combination with the eighteenth aspect, wherein the processor and the memory are further configured to: transmit a signal using at least one different beam outside of the predetermined beam or beam group during the idle period.

In a twentieth aspect, alone or in combination with any of the eleventh to nineteenth aspects, wherein the processor and the memory are further configured to: select the one or more beams without receiving a feedback on the one or more beams from another network node.

In a twenty-first aspect, a wireless device for wireless communication in a wireless network, comprises: means for sensing a spectrum on a plurality of first beams in a first frame of a plurality of frames, each of the plurality of frames comprising a sensing period for sensing the spectrum and an idle period for facilitating spectrum sharing with another wireless network; means for selecting one or more beams of the plurality of first beams based on a result of sensing the spectrum in the sensing period of the first frame; and means for transmitting a signal in the first frame using the one or more beams in a time interval between the sensing period and the idle period of the first frame.

In a twenty-second aspect, alone or in combination with the twenty-first aspect, the wireless device further comprises: means for sensing the spectrum on a plurality of second beams in a second frame of the plurality of frames, wherein the plurality of second beams comprise at least one beam outside of the plurality of first beams.

In a twenty-third aspect, alone or in combination with any of the twenty-first to twenty-second aspects, the wireless device further comprises: means for sensing the spectrum on the plurality of first beams in a second frame of the plurality of frames, wherein the sensing of the plurality of first beams follows a first sequence of the plurality of first beams in the first frame and a second sequence of the plurality of first beams in the second frame, the first sequence being different from the second sequence.

In a twenty-fourth aspect, alone or in combination with the twenty-third aspect, the wireless device further comprises: means for determining the first sequence by randomly selecting a sensing order of the plurality of first beams in the first frame; and means for determining the second sequence by randomly selecting a sensing order of the plurality of first beams in the second frame.

In a twenty-fifth aspect, alone or in combination with the twenty-third aspect, the wireless further comprises: means for deriving the second sequence from the first sequence based on a round-robin algorithm.

In a twenty-sixth aspect, alone or in combination with any of the twenty-first to twenty-fifth aspects, wherein: the sensing period comprises a plurality of sensing slots; and the means for sensing the spectrum is configured to sense the spectrum using a different beam of the plurality of first beams in a different respective sensing slot of the plurality of sensing slots.

In a twenty-seventh aspect, alone or in combination with the twenty-sixth aspect, the wireless device further comprises: means for transmitting one or more reservation messages in the plurality of sensing slots to reserve the one or more beams for communication in the first frame; or means for transmitting one or more reservation messages after the plurality of sensing slots to reserve the one or more beams for communication in the first frame.

In a twenty-eighth aspect, alone or in combination with any of the twenty-first to twenty-seventh aspects, the wireless device further comprises: means for refraining from transmitting a signal associated with a predetermined beam or beam group of the wireless network during the idle period; and means for transmitting a signal using at least one different beam outside of the predetermined beam or beam group during the idle period.

In a twenty-ninth aspect, alone or in combination with any of the twenty-first to twenty-eighth aspects, wherein the means for selecting the one or more beams is configured to: select the one or more beams without receiving a feedback on the one or more beams from another network node.

In a thirtieth aspect, a non-transitory computer-readable medium stores computer-executable code at an apparatus for wireless communication. The computer-readable medium comprises instructions for causing the apparatus to: sense a spectrum on a plurality of first beams in a first frame of a plurality of frames, each of the plurality of frames comprising a sensing period for sensing the spectrum and an idle period for facilitating spectrum sharing with another wireless network; select one or more beams of the plurality of first beams based on a result of sensing the spectrum in the sensing period of the first frame; and transmit a signal in the first frame using the one or more beams in a time interval between the sensing period and the idle period of the first frame.

In a thirty-first aspect, the computer-readable medium comprises instructions for causing the apparatus to perform the methods of any of the above first to tenth aspects.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method of wireless communication operable at a transmitting device in a wireless network, comprising:
sensing a spectrum on a plurality of first beams following a first sequence of the plurality of first beams in a first frame of a plurality of frames, each of the plurality of frames comprising a sensing period for sensing the spectrum and an idle period for facilitating spectrum sharing with another wireless network and configured to forbid transmission of different beams;
selecting one or more beams of the plurality of first beams based on a result of sensing the spectrum in the sensing period of the first frame;
transmitting a signal in the first frame using the one or more beams in a time interval between the sensing period and the idle period of the first frame; and
sensing the spectrum on the plurality of first beams following a second sequence of the same plurality of first beams in a second frame of the plurality of frames, the second sequence being derived and different from the first sequence.

2. The method of claim 1, further comprising:
sensing the spectrum on a plurality of second beams in a third frame of the plurality of frames, wherein the plurality of second beams comprise at least one beam outside of the plurality of first beams.

3. The method of claim 1, further comprising:
determining the first sequence by randomly selecting a sensing order of the plurality of first beams in the first frame.

4. The method of claim 1, further comprising:
deriving the second sequence from the first sequence based on a round-robin algorithm.

5. The method of claim 1, wherein:
the sensing period comprises a plurality of sensing slots; and
the sensing the spectrum comprises sensing the spectrum using a different beam of the plurality of first beams in a different respective sensing slot of the plurality of sensing slots.

6. The method of claim 5, further comprising:
transmitting one or more reservation messages in the plurality of sensing slots to reserve the one or more beams for communication in the first frame.

7. The method of claim 1, further comprising:
refraining from transmitting a signal associated with a predetermined beam or beam group of the wireless network during the idle period.

8. The method of claim 7, further comprising:
transmitting a signal using at least one different beam outside of the predetermined beam or beam group during the idle period.

9. The method of claim 1, wherein the selecting the one or more beams comprises:
selecting the one or more beams without receiving a feedback on the one or more beams from another network node.

10. An apparatus for wireless communication, comprising:
- a communication interface configured to access a spectrum of a wireless network;
- a memory; and
- a processor coupled with the communication interface and the memory,
- wherein the processor and the memory are configured to:
  - sense the spectrum on a plurality of first beams following a first sequence of the plurality of first beams in a first frame of a plurality of frames, each of the plurality of frames comprising a sensing period for sensing the spectrum and an idle period for facilitating spectrum sharing with another wireless network and configured to forbid transmission of different beams;
  - select one or more beams of the plurality of first beams based on a result of sensing the spectrum in the sensing period of the first frame;
  - transmit a signal in the first frame using the one or more beams in a time interval between the sensing period and the idle period of the first frame; and
  - sense the spectrum on the plurality of first beams following a second sequence of the same plurality of first beams in a second frame of the plurality of frames, the second sequence being derived and different from the first sequence.

11. The apparatus of claim 10, wherein the processor and the memory are further configured to:
- sense the spectrum on a plurality of second beams in a third frame of the plurality of frames, wherein the plurality of second beams comprise at least one beam outside of the plurality of first beams.

12. The apparatus of claim 10, wherein the processor and the memory are further configured to:
- determine the first sequence by randomly selecting a sensing order of the plurality of first beams in the first frame.

13. The apparatus of claim 10, wherein the processor and the memory are further configured to:
- derive the second sequence from the first sequence based on a round-robin algorithm.

14. The apparatus of claim 10, wherein the processor and the memory are further configured to:
- sense the spectrum using a different beam of the plurality of first beams in a different respective sensing slot of a plurality of sensing slots in the sensing period.

15. The apparatus of claim 14, wherein the processor and the memory are further configured to:
- transmit one or more reservation messages in the plurality of sensing slots to reserve the one or more beams for communication in the first frame.

16. The apparatus of claim 10, wherein the processor and the memory are further configured to:
- refrain from transmitting a signal associated with a predetermined beam or beam group of the wireless network during the idle period.

17. The apparatus of claim 16, wherein the processor and the memory are further configured to:
- transmit a signal using at least one different beam outside of the predetermined beam or beam group during the idle period.

18. The apparatus of claim 10, wherein the processor and the memory are further configured to:
- select the one or more beams without receiving a feedback on the one or more beams from another network node.

19. A wireless device for wireless communication in a wireless network, comprising:
- means for sensing a spectrum on a plurality of first beams following a first sequence of the plurality of first beams in a first frame of a plurality of frames, each of the plurality of frames comprising a sensing period for sensing the spectrum and an idle period for facilitating spectrum sharing with another wireless network and configured to forbid transmission of different beams;
- means for selecting one or more beams of the plurality of first beams based on a result of sensing the spectrum in the sensing period of the first frame;
- means for transmitting a signal in the first frame using the one or more beams in a time interval between the sensing period and the idle period of the first frame; and
- means for sensing the spectrum on the plurality of first beams following a second sequence of the same plurality of first beams in a second frame of the plurality of frames, the second sequence being derived and different from the first sequence.

20. The wireless device of claim 19, further comprising:
means for sensing the spectrum on a plurality of second beams in a third frame of the plurality of frames, wherein the plurality of second beams comprise at least one beam outside of the plurality of first beams.

21. The wireless device of claim 19, further comprising:
means for determining the first sequence by randomly selecting a sensing order of the plurality of first beams in the first frame.

22. The wireless device of claim 19, further comprising:
means for deriving the second sequence from the first sequence based on a round-robin algorithm.

23. The wireless device of claim 19, wherein:
the sensing period comprises a plurality of sensing slots; and
the means for sensing the spectrum is configured to sense the spectrum using a different beam of the plurality of first beams in a different respective sensing slot of the plurality of sensing slots.

24. The wireless device of claim 23, further comprising:
means for transmitting one or more reservation messages in the plurality of sensing slots to reserve the one or more beams for communication in the first frame.

25. The wireless device of claim 19, further comprising:
means for refraining from transmitting a signal associated with a predetermined beam or beam group of the wireless network during the idle period; and
means for transmitting a signal using at least one different beam outside of the predetermined beam or beam group during the idle period.

26. The wireless device of claim 19, wherein the means for selecting the one or more beams is configured to:
select the one or more beams without receiving a feedback on the one or more beams from another network node.

27. A non-transitory computer-readable medium storing computer-executable code at an apparatus for wireless communication, comprising instructions for causing the apparatus to:
sense a spectrum on a plurality of first beams following a first sequence of the plurality of first beams in a first frame of a plurality of frames, each of the plurality of frames comprising a sensing period for sensing the spectrum and an idle period for facilitating spectrum sharing with another wireless network and configured to forbid transmission of different beams;

select one or more beams of the plurality of first beams based on a result of sensing the spectrum in the sensing period of the first frame;
transmit a signal in the first frame using the one or more beams in a time interval between the sensing period and the idle period of the first frame; and
sense the spectrum on the plurality of first beams following a second sequence of the same plurality of first beams in a second frame of the plurality of frames, the second sequence being different from the first sequence.

\* \* \* \* \*